United States Patent
Yokoyama (10) Patent No.: US 9,817,188 B2
(45) Date of Patent: Nov. 14, 2017

(54) PIGTAIL FIBER MODULE

(71) Applicant: SUMITOMO METAL MINING CO., LTD., Tokyo (JP)

(72) Inventor: Yuichi Yokoyama, Ome (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/155,449

(22) Filed: May 16, 2016

(65) Prior Publication Data

US 2016/0341899 A1   Nov. 24, 2016

(30) Foreign Application Priority Data

May 21, 2015   (JP) .................. 2015-103649

(51) Int. Cl.
  *G02B 6/26* (2006.01)
  *G02B 6/02* (2006.01)
  *G02B 6/36* (2006.01)

(52) U.S. Cl.
  CPC ......... *G02B 6/262* (2013.01); *G02B 6/02009* (2013.01); *G02B 6/02395* (2013.01); *G02B 6/3624* (2013.01)

(58) Field of Classification Search
  CPC .. G02B 6/62; G02B 6/02009; G02B 6/02395; G02B 6/3624
  USPC .......................................................... 385/38
  See application file for complete search history.

(56) References Cited

U.S. PATENT DOCUMENTS

| | | | | |
|---|---|---|---|---|
| 5,469,521 A * | 11/1995 | Coutts | .................. | G02B 6/3861 385/77 |
| 6,409,394 B1 * | 6/2002 | Ueda | ....................... | G02B 6/25 385/80 |
| 7,452,137 B2 * | 11/2008 | Droege | ............... | G02B 6/3834 385/55 |
| 8,702,320 B2 * | 4/2014 | Ott | ....................... | G02B 6/3835 385/78 |
| 8,989,541 B2 * | 3/2015 | Zimmel | ............... | G02B 6/3861 385/100 |

(Continued)

FOREIGN PATENT DOCUMENTS

JP    2012-255999 A1   12/2012

*Primary Examiner* — Thomas A Hollweg
*Assistant Examiner* — Erin Chiem
(74) *Attorney, Agent, or Firm* — Kratz, Quintos & Hanson, LLP (57) ABSTRACT

A pigtail fiber module comprises: a large mode area fiber (LMA fiber) 10 having a fiber core wire 1 composed of a core where single-mode light travels and a clad, and a protective coating 2 surrounding the core wire; and a fiber holding member, and has the following structure. The fiber holding member includes a ferrule 20 having a through hole 21, and a capillary 30 having a narrow hole 31 and incorporated in a tip end side of the ferrule. The narrow hole houses the fiber core wire of the LMA fiber. The through hole houses the LMA fiber having the protective coating. An end portion of the narrow hole at the through hole side is provided with a sealing member 40 for sealing a gap between the fiber core wire and the narrow hole and shutting the narrow hole off from the through hole, and the protective coating is fixed to the through hole with a thermosetting adhesive.

2 Claims, 5 Drawing Sheets
(2 of 5 Drawing Sheet(s) Filed in Color)

(56) References Cited

U.S. PATENT DOCUMENTS

| | | | |
|---|---|---|---|
| 2006/0204195 A1* | 9/2006 | Kurosawa | G02B 6/02347 385/125 |
| 2006/0229416 A1* | 10/2006 | Walker | C08L 27/12 525/474 |
| 2012/0027351 A1* | 2/2012 | Asselin | A61B 18/22 385/39 |
| 2012/0321257 A1* | 12/2012 | Lu | G02B 6/3861 385/84 |

* cited by examiner

BEFORE CURING ADHESIVE

Fig.2B

AFTER CURING ADHESIVE

Fig.3A

BEFORE CURING ELASTIC ADHESIVE

Fig.3B

AFTER CURING ELASTIC ADHESIVE

Fig.3C

AFTER CURING THERMOSETTING ADHESIVE

PIGTAIL FIBER MODULE

BACKGROUND OF THE INVENTION

1. Field of the Invention

This invention relates to a pigtail fiber module to be used mainly in fiber lasers, the pigtail fiber module including a large mode area fiber and a fiber holding member provided at a tip end of the fiber. Particularly, this invention relates to an improvement in a pigtail fiber module which emits beams having a sectional shape resembling a perfect circle as close as possible.

2. Description of the Prior Art

A pigtail fiber module is a type of light transmission media used in optical communications, laser processing machines, and so forth. Recently, the power of beams transmitted in laser processing machines and so forth has been increased, and also a wide variety of optical fibers have been in use. In addition, a current mainstream optical fiber usable for high power output is a large mode area fiber (hereinafter also referred to as "LMA fiber" in some cases).

As a pigtail fiber module using this type of large mode area fiber, there has been known a conventional technique (pigtail module) described in Japanese Patent Application Publication No. 2012-255999 (Patent Document 1).

The pigtail module according to the conventional technique is characterized as follows. Specifically, the pigtail module includes: a fiber holding member; and a pigtail fiber (large mode area fiber) having a fiber core wire composed of a core where single-mode light travels and a clad surrounding an outer periphery of the core, and a protective coating surrounding an outer periphery of the fiber core wire. The fiber core wire is exposed by removing a portion of the protective coating, and fixed in a through hole of the fiber holding member with an adhesive made of a thermosetting resin (thermosetting adhesive). Moreover, the through hole is set to have an inner diameter satisfying such a condition that an average gap between the fiber core wire (clad) and a portion in the through hole where the fiber core wire (clad) is fixed with the adhesive [(the inner diameter of the through hole−the diameter of the clad)/2] is less than 1 μm (see claim 1 of Patent Document 1).

Moreover, by setting the through hole to have an inner diameter satisfying the condition that the average gap [(the inner diameter of the through hole−the diameter of the clad)/2] is less than 1 μm, the adhesive present in the gap between the fiber core wire (clad) and the through hole also has a thickness of less than 1 μm. This decreases a stress on the optical fiber due to the curing and contraction of the adhesive. Hence, in the pigtail module according to the conventional technique, the shape of a light intensity distribution of emitted beams can supposedly be kept in the same state as when the beams enter the pigtail module (paragraphs 0011 and 0018 of see Patent Document 1).

Meanwhile, after conducting a technical evaluation on the pigtail module according to the conventional technique, the present inventor has noticed the following problems on the contrary to the description of Patent Document 1.

Specifically, in this type of large mode area fiber, an end cap is fused to a tip end of the fiber (such as coreless fiber), and a variation is observed in the light intensity distribution of beams emitted from an end surface of the end cap. Moreover, when the large mode area fiber is used in a laser processing machine, since such a variation in the light intensity distribution greatly influences the processing performance and processing precision, it is desirable that the fiber should keep the original light intensity distribution.

Hence, the present inventor has examined the variation in the light intensity distribution according to the conventional technique in detail. The result has revealed that a cause of the variation is an adhesive made of a thermosetting resin (thermosetting adhesive) used for the adhesion of the fiber core wire (clad) to the through hole of the fiber holding member. To be more specific, although the adhesive present in the gap between the fiber core wire (clad) and the through hole has a thickness of less than 1 μm, an external stress is still applied on the fiber core wire (clad) by the curing and contraction of the thermosetting adhesive, causing a variation in the light intensity distribution. Furthermore, the variation is also caused by the fact that, in the pigtail module according to Patent Document 1, the setting to satisfy the condition that the average gap [(the inner diameter of the through hole−the diameter of the clad)/2] is less than 1 μm is difficult in reality in consideration of the processing precision of the fiber holding member and the large mode area fiber (LMA fiber).

SUMMARY OF THE INVENTION

The present invention has been made in view of such problem as described above. An object of the present invention is to provide a pigtail fiber module which emits beams having a sectional shape resembling a perfect circle as close as possible, regardless of the processing precision of a fiber holding member and a large mode area fiber (LMA fiber).

Accordingly, the present inventor has continued to earnestly study the structure of pigtail fiber modules to achieve the above object. As a result, the inventor has found out a structure of a pigtail fiber module in which a thermosetting adhesive does not adhere to a fiber core wire exposed by removing a protective coating of a LMA fiber.

Specifically, a first aspect according to the present invention is a pigtail fiber module comprising:
  a large mode area fiber having
    a fiber core wire composed of a core where single-mode light travels and a clad surrounding an outer periphery of the core, and
    a protective coating surrounding an outer periphery of the fiber core wire; and
  a fiber holding member configured to hold a tip end side of the large mode area fiber, characterized by having such a structure that
    the fiber holding member includes
    a ferrule having a through hole at a main-body central portion thereof, and
    a capillary incorporated in a tip end side of the ferrule and having a narrow hole at a central portion of the capillary, the narrow hole communicating with the through hole,
    the narrow hole of the capillary houses the fiber core wire of the large mode area fiber from which a portion of the protective coating is removed,
    the through hole of the ferrule houses the large mode area fiber having the protective coating,
    an end portion of the narrow hole at the through hole side is provided with a sealing member configured to seal a gap between the fiber core wire and the narrow hole and shut the narrow hole off from the through hole, and
    the protective coating housed in the through hole is fixed to the through hole with a thermosetting adhesive.

Moreover, a second aspect according to the present invention is the pigtail fiber module according to the first aspect, characterized in that the sealing member, which seals the gap between the fiber core wire and the narrow hole and shuts the narrow hole off from the through hole, is formed of an elastic adhesive.

A third aspect according to the present invention is the pigtail fiber module according to the second aspect, characterized in that the elastic adhesive has a Shore A hardness of 70 or less when cured.

Hence, the pigtail fiber module according to the present invention has such a structure that the fiber holding member configured to hold the tip end side of the large mode area fiber includes the ferrule having the through hole at the main-body central portion, and the capillary incorporated in the tip end side of the ferrule and having the narrow hole at the central portion of the capillary, the narrow hole communicating with the through hole, the narrow hole of the capillary houses the fiber core wire of the large mode area fiber from which a portion of the protective coating is removed, the through hole of the ferrule houses the large mode area fiber having the protective coating, the end portion of the narrow hole at the through hole side is provided with the sealing member configured to seal the gap between the fiber core wire and the narrow hole and shut the narrow hole off from the through hole, and the protective coating housed in the through hole is fixed to the through hole with a thermosetting adhesive. The thermosetting adhesive fixing the protective coating does not enter the narrow hole through the through hole. Accordingly, no external stress due to the curing and contraction of the thermosetting adhesive is applied to the fiber core wire housed in the narrow hole of the capillary.

Thus, the present invention makes it possible, as an effect, to provide a pigtail fiber module causing no variation in a light intensity distribution of beams emitted from a large mode area fiber (LMA fiber).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A and 2B are photographs of images showing, on a beam profiler (system for measuring the intensity distribution and shape of beams), beams emitted from an end surface of an end cap of a pigtail fiber module according to Comparative Example 1 (Patent Document 1) in which a fiber core wire (the fiber core wire is exposed by removing a protective coating) is fixed in a through hole of a fiber holding member with a thermosetting adhesive.

FIGS. 3A, 3B and 3C are photographs of images showing, on the beam profiler, beams emitted from an end surface of an end cap of a pigtail fiber module according to Example 1 in which a narrow hole of a capillary incorporated in a tip end side of a ferrule houses a fiber core wire (the fiber core wire is exposed by removing a protective coating), a portion of the narrow hole at the through hole side is provided with a sealing member made of an elastic adhesive configured to shut the narrow hole off from a through hole, and a protective coating of a large mode area fiber housed in the through hole is fixed with a thermosetting adhesive.

DESCRIPTION OF THE PREFERRED EMBODIMENTS

Hereinafter, embodiments of the present invention will be described in detail.

As described above, a cause of a variation in a light intensity distribution of beams emitted from a large mode area fiber (LMA fiber) is an external stress applied on the LMA fiber. Moreover, in the pigtail module according to the conventional technique, the fiber core wire (clad) adheres to the through hole of the fiber holding member with a thermosetting adhesive. As the thermosetting adhesive, a thermosetting epoxy resin is generally used, and such a thermosetting epoxy resin is inevitably contracted by approximately several percentages when cured. In addition, the cured adhesive has such a high hardness that a large residual stress is generated against the optical fiber. The core of the large mode area fiber (LMA fiber) is sensitive to a residual stress, so that a variation is caused at a high frequency in a light intensity distribution of beams emitted from the optical fiber.

Hence, the present inventor has examined what kind of stress generated against a large mode area fiber causes a variation in a light intensity distribution of emitted beams. The result has revealed that a variation is observed in a light intensity distribution of emitted beams when a thermosetting adhesive adheres to and cures on the surface of a fiber core wire (clad); meanwhile, a variation does not occur in a light intensity distribution of emitted beams when the thermosetting adhesive adheres to and cures on a protective coating surrounding an outer periphery of the fiber core wire (clad). As the material constituting the protective coating, a material having a low hardness is selected such as an ultraviolet curable resin (for example, acrylic resin), and presumably sufficiently reduces the residual stress of the thermosetting adhesive.

By the way, in a pigtail fiber module, a glass material called end cap is generally fused to a fiber tip end (such as coreless fiber), as described above, to prevent damage to the fiber end portion.

Then, in fusing the end cap to the LMA fiber, the protective coating needs to be removed. This exposes, as a natural consequence, the clad at the tip end portion of the LMA fiber. Further, since a tip end portion of an end cap is generally beveled by several polishings to prevent light reflected at the end cap end surface from returning to the LMA fiber, a fiber core wire (clad) is normally inserted in a ferrule made of zirconia or the like, and after the fiber core wire (clad) is fixed to the ferrule using a thermosetting epoxy resin, it is necessary to bevel the fiber tip end portion. For this reason, how to hold an end capped fiber with a fiber holding member has been a problem in the production of a pigtail fiber module structure in which an adhesive does not adhere to a fiber core wire (clad). The problem has been solved by the present invention in which: a fiber holding member includes a ferrule having a through hole at a main-body central portion thereof, and a capillary incorporated in a tip end side of the ferrule and having a narrow hole at a central portion of the capillary, the narrow hole communicating with the through hole; the narrow hole of the capillary houses a fiber core wire of a large mode area fiber from which a portion of a protective coating is removed; the through hole of the ferrule houses the large mode area fiber having the protective coating; and an end portion of the narrow hole at the through hole side is provided with a sealing member configured to seal a gap between the fiber core wire and the narrow hole and shut the narrow hole off from the through hole.

Note that the material of the sealing member configured to seal the gap between the fiber core wire and the narrow hole and shut the narrow hole off from the through hole is preferably a material which is capable of preventing a thermosetting adhesive from entering the narrow hole through the through hole, and which does not cause an external stress on the fiber core wire even when adhering to the fiber core wire. An example of such a material includes an elastic adhesive capable of stretching by 10% or more. Specific examples include silicone-based adhesives (such as product name: ThreeBond TB1220 manufactured by Three-Bond Holdings Co., Ltd.), modified silicone-based adhesives (such as product name: ThreeBond TB1530 manufactured by ThreeBond Holdings Co., Ltd., and product names: Cemedine Super-X No. 8008 and Cemedine Super-XG777 manufactured by Cemedine Co., Ltd.), acrylic-based adhesives (such as product name: ThreeBond TB3955 manufactured by ThreeBond Holdings Co., Ltd.), urethane-based adhesives (such as product names: 3M Polyurethane Adhesive 540 and 3M Hybrid Adhesive 740 manufactured by 3M), and other adhesives all of which are elastic adhesives having a Shore A hardness (JIS K 6253) of 70 or less when cured.

Hereinafter, Examples of the present invention will be described specifically together with Comparative Example.

EXAMPLE 1

Figure 1:
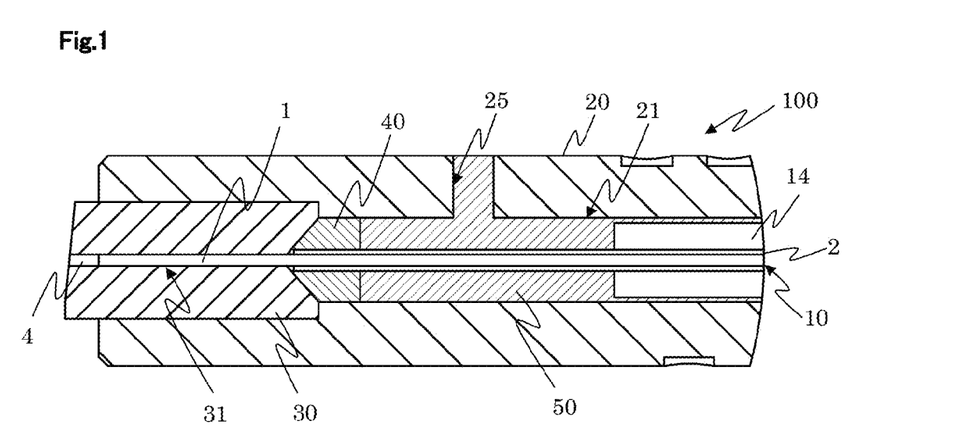
FIG. 1 is a schematic configurational sectional view of a pigtail fiber module according to the present invention.

A pigtail fiber module 100 according to Example 1 includes: a large mode area fiber (LMA fiber) 10 having a fiber core wire 1 composed of a core having a diameter (core diameter) of 10 μm where single-mode light travels and a clad having a diameter (clad diameter) of 125 μm surrounding an outer periphery of the core, and a protective coating 2 surrounding an outer periphery of the fiber core wire 1; and a fiber holding member configured to hold a tip end side of the large mode area fiber 10. As shown in FIG. 1, the pigtail fiber module 100 has the following structure. Specifically, the fiber holding member includes a SUS-made ferrule 20 having a through hole 21 at a main-body central portion thereof, and a zirconia-made capillary 30 incorporated in a tip end side of the ferrule 20 and having a narrow hole 31 at a central portion of the capillary 30, the narrow hole 31 communicating with the through hole 21. The narrow hole 31 of the capillary 30 houses the fiber core wire 1 exposed by removing a portion of the protective coating 2 of the LMA fiber 10. The through hole 21 of the ferrule 20 houses the LMA fiber 10 having the protective coating 2. An end portion of the narrow hole 31 at the through hole 21 side is provided with a sealing member 40 configured to seal a gap between the fiber core wire 1 and the narrow hole 31 and shut the narrow hole 31 off from the through hole 21. The protective coating 2 of the LMA fiber 10 housed in the through hole 21 is fixed to the through hole 21 with a thermosetting adhesive 50.

Note that a beveled end cap 4 is fused to a tip end of the fiber core wire 1 housed in the narrow hole 31 of the capillary 30. Moreover, in Example 1 and Comparative Example 1 to be described later, a thermosetting epoxy resin EPOTEK 353ND (Shore A strength: 100) manufactured by Epoxy Technology Inc. was used as the thermosetting adhesive.

By the way, a pigtail fiber module is normally required to have a certain tensile strength when a fiber is pulled from the module (i.e., a magnitude of tensile force the pigtail fiber module can withstand when the fiber is pulled off from the module). In order to obtain a desired tensile strength, an adhesive having a high hardness after curing is needed such as a thermosetting adhesive. Hence, in the structure, the protective coating 2 of the LMA fiber 10 housed in the through hole 21 is fixed to the through hole 21 with the thermosetting adhesive 50.

Production Steps for Pigtail Fiber Module

The pigtail fiber module 100 according to Example 1 was obtained through the following steps.

Figure 4A:
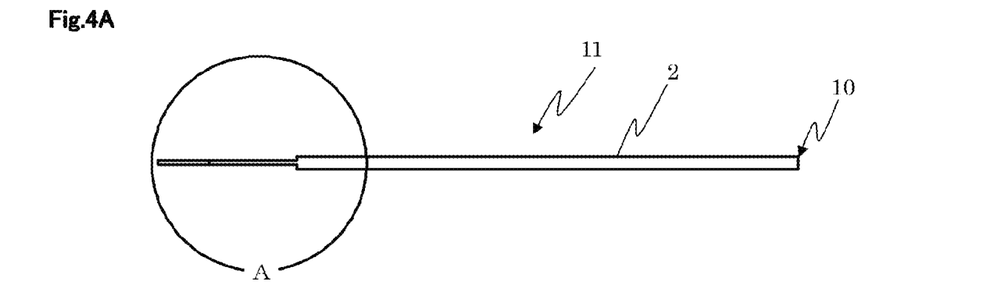
FIG. 4A is a schematic configurational sectional view of an end capped fiber in which an end cap is fused to a tip end of the fiber core wire.
Figure 4B:
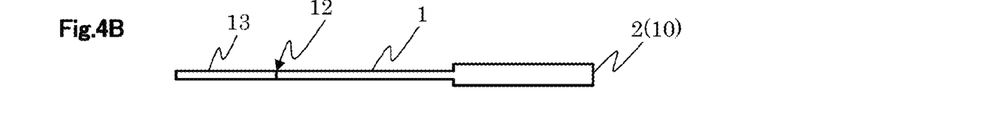
FIG. 4B is a partially enlarged view of a portion indicated by reference sign A in FIG. 4A.

First, a fiber 13 for the end cap was fused to the tip end of the fiber core wire 1 exposed by removing a tip end side of the protective coating 2, and cut such that the remaining fiber 13 for the end cap has a desired length. Thus, an end capped fiber 11 shown in FIGS. 4A and 4B was produced. Note that reference sign 12 denotes a fused portion between the fiber core wire 1 and the fiber 13 for the end cap.

Next, an outer periphery of the obtained end capped fiber 11 was covered with a loose tube 14 made of a hard rubber or the like. The loose tube 14 was fixed at such a position that a desired length of the protective coating 2 of the end capped fiber 11 was exposed. Thus, the end capped fiber covered with the loose tube shown in FIGS. 5A and 5B was produced.

Figure 5A:
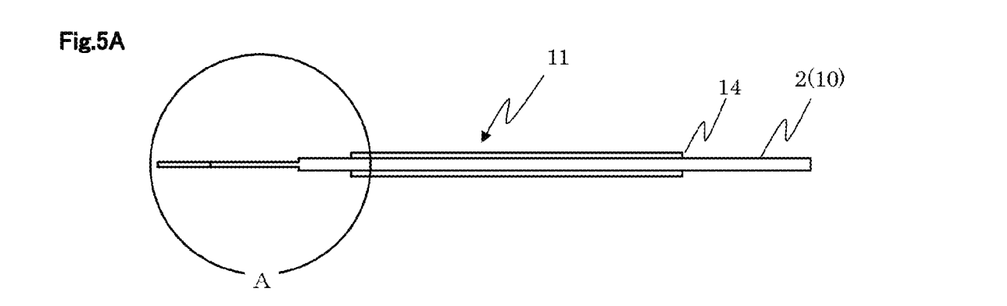
FIG. 5A is a schematic configurational sectional view of the end capped fiber in which an outer periphery of the protective coating is covered with a loose tube.
Figure 5B:
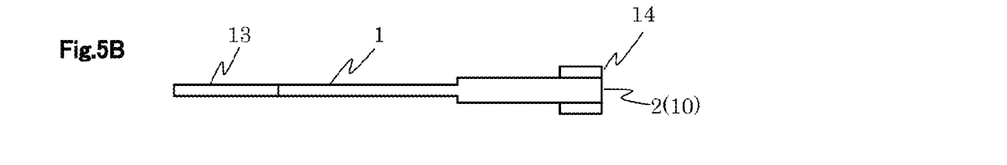
FIG. 5B is a partially enlarged view of a portion indicated by reference sign A in FIG. 5A.
Figure 6:
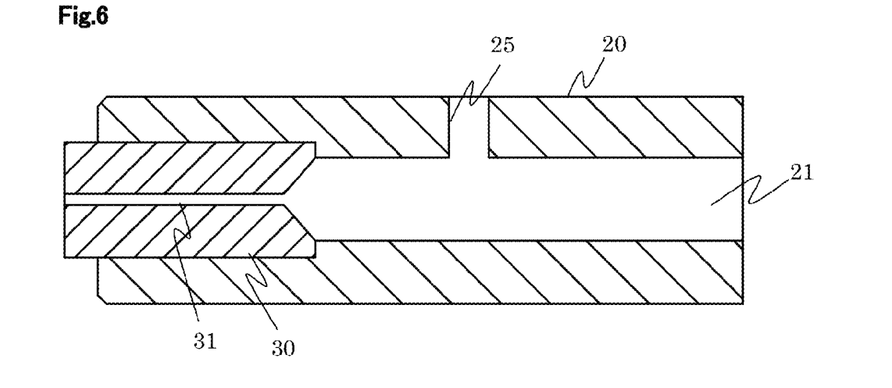
FIG. 6 is a schematic configurational sectional view of the fiber holding member including the metal ferrule and the capillary incorporated in the tip end side of the ferrule before the end capped fiber covered with the loose tube is inserted in the fiber holding member.
Figure 7A:
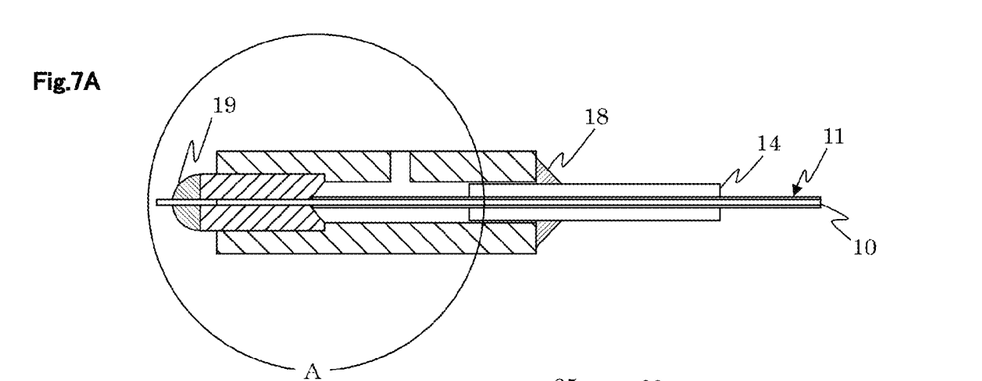
FIG. 7A is a schematic configurational sectional view of the fiber holding member in which the end capped fiber covered with the loose tube is inserted.
Figure 7B:
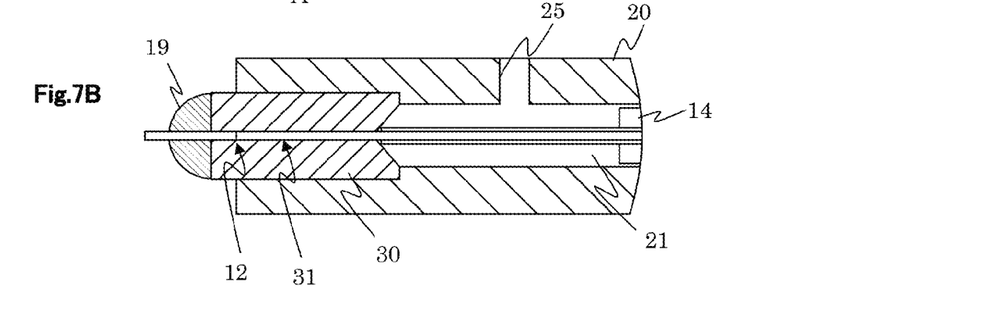
FIG. 7B is a partially enlarged view of a portion indicated by reference sign A in FIG. 7A.

Next, the end capped fiber covered with the loose tube 14 shown in FIGS. 5A and 5B was inserted in the fiber holding member including the SUS-made ferrule 20 having the through hole 21 and the zirconia-made capillary 30 having the narrow hole 31 shown in FIG. 6. In addition, the insertion position was adjusted in such a manner that the fused portion 12 of the end capped fiber was inserted to a desired position in the narrow hole 31 of the zirconia-made capillary 30. Then, a resin for fixation was used to fix the fiber holding member and the end capped fiber 11 at positions of a loose-tube fixing portion 18 and a fiber fixing portion 19 as shown in FIGS. 7A and 7B.

Figure 8A:
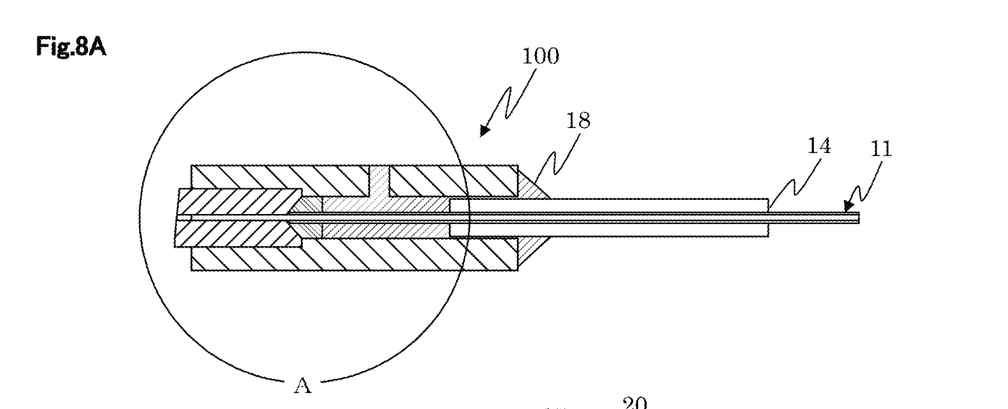
FIG. 8A is a schematic configurational sectional view of the pigtail fiber module according to the present invention produced by polishing the fiber holding member in which the end capped fiber covered with the loose tube is inserted.
Figure 8B:
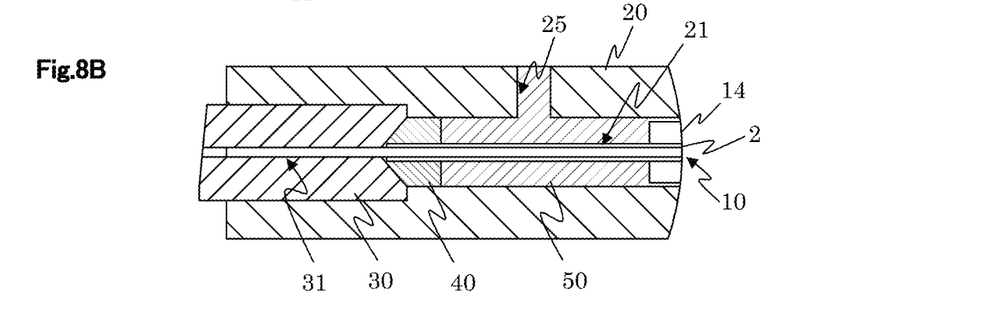
FIG. 8B is a partially enlarged view of a portion indicated by reference sign A in FIG. 8A.

Next, a tip end of the capillary 30 of the fiber holding member in which the end capped fiber 11 was inserted and fixed was polished to set the length and tip end angle of the fiber for the end cap at desired values. Subsequently, an elastic adhesive [acrylic modified silicone resin having a Shore A hardness of 43 (product name: Cemedine Super-X No. 8008 manufactured by Cemedine Co., Ltd.)] was poured from a side hole 25 for adhesive filling in the SUS-made ferrule 20. The adhesive was cured to form the sealing member 40 configured to shut the through hole 21 of the ferrule 20 off from the narrow hole 31 of the capillary 30. Further, a thermosetting adhesive was poured from the side hole 25 for adhesive filling. The adhesive 50 was thermally cured to thus produce the pigtail fiber module 100 according to Example 1 as shown in FIGS. 8A and 8B.

EXAMPLE 2

A pigtail fiber module according to Example 2 was produced in the same manner as in Example 1, except that an elastic adhesive used was an acrylic modified silicone resin having a Shore A hardness of 58 (product name: Super-XG777 manufactured by Cemedine Co., Ltd.).

COMPARATIVE EXAMPLE 1

A pigtail fiber module according to Comparative Example 1 (which includes: a fiber holding member; and a pigtail fiber (large mode area fiber) having a fiber core wire composed of a core where single-mode light travels and a clad surrounding an outer periphery of the core, and a protective coating surrounding an outer periphery of the fiber core wire) was produced by inserting the fiber core wire exposed by removing a portion of the protective coating into a through hole of the fiber holding member, and then fixing the fiber core wire to the through hole using a thermosetting adhesive.

Note that the pigtail fiber module was produced in such a manner as to satisfy the condition of Patent Document 1 that the average gap between the fiber core wire (clad) and the portion in the through hole where the fiber core wire (clad) is fixed with the adhesive [(the inner diameter of the through hole−the diameter of the clad)/2] was set to less than 1 μm. Moreover, the pigtail fiber (large mode area fiber) incorporated in the fiber holding member was set to have the same configuration as the end capped fiber according to Example 1.

[Evaluation]

Figure 2A:
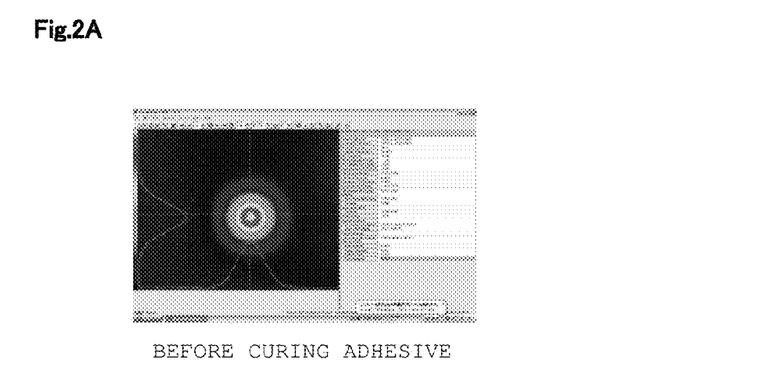
FIG. 2A is a photograph taken before the thermosetting adhesive was cured (circularity: 0.99, Gaussian fitting value: 0.95)
Figure 2B:
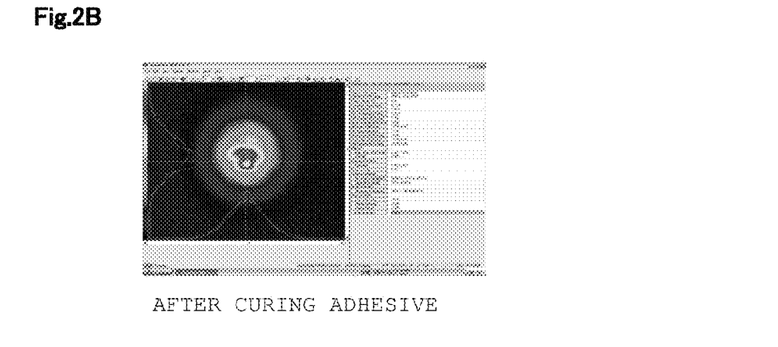
FIG. 2B is a photograph taken after the thermosetting adhesive was cured (circularity: 0.94, Gaussian fitting value: 0.89).

(1) FIGS. 2A and 2B are photographs of images showing, on a beam profiler (system for measuring the intensity distribution and shape of beams), beams emitted from an end surface of the end cap of the pigtail fiber module according to Comparative Example 1 (Patent Document 1) in which the fiber core wire (the fiber core wire was exposed by removing the protective coating) was fixed in the through hole of the fiber holding member with the thermosetting adhesive. FIG. 2A is a photograph taken before the thermosetting adhesive was cured (circularity: 0.99, Gaussian fitting value: 0.95), and FIG. 2B is a photograph taken after the thermosetting adhesive was cured (circularity: 0.94, Gaussian fitting value: 0.89).

Light emitted from the fiber is originally supposed to be single-mode light, and accordingly Gaussian beams whose ideal shape is a perfect circle, and whose intensity distribution is represented by the Gaussian distribution.

Next, in the state before the thermosetting adhesive was cured as shown in the photograph of FIG. 2A, high values of both the circularity (the value is ideally 1) and the Gaussian fitting value (the index indicating how close the X component and the Y component are to the ideal Gaussian distribution, and the value of the index is ideally 1) were exhibited. In contrast, in the state after the adhesive was cured as shown in the photograph of FIG. 2B, no large change was observed in the circularity, but a large change was observed in the Gaussian fitting value (before the curing: 0.95, after the curing: 0.89). If a variation occurs in an intensity distribution of emitted light as described above, the loss is a great when light emitted from the fiber is collected and enters the optical fiber again.

Figure 3A:
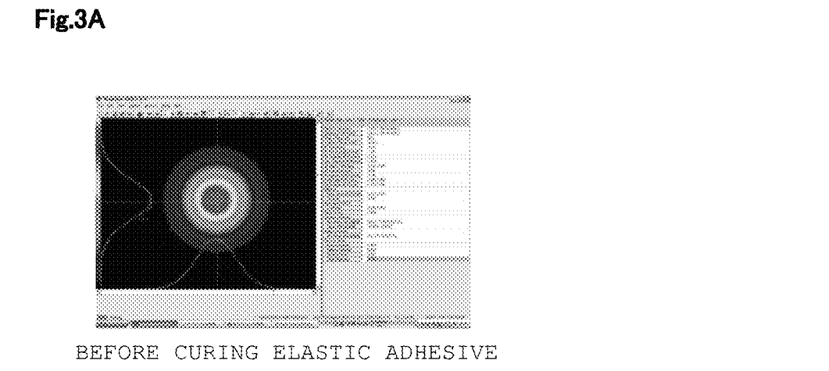
FIG. 3A is a photograph taken before the elastic adhesive was cured.
Figure 3B:
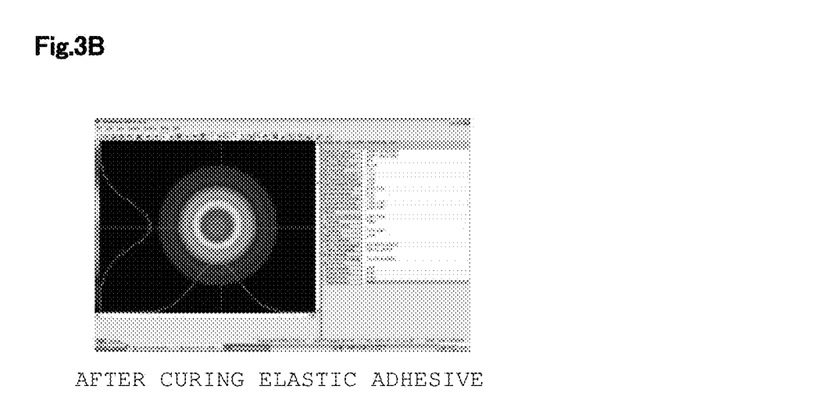
FIG. 3B is a photograph taken after the elastic adhesive was cured.
Figure 3C:
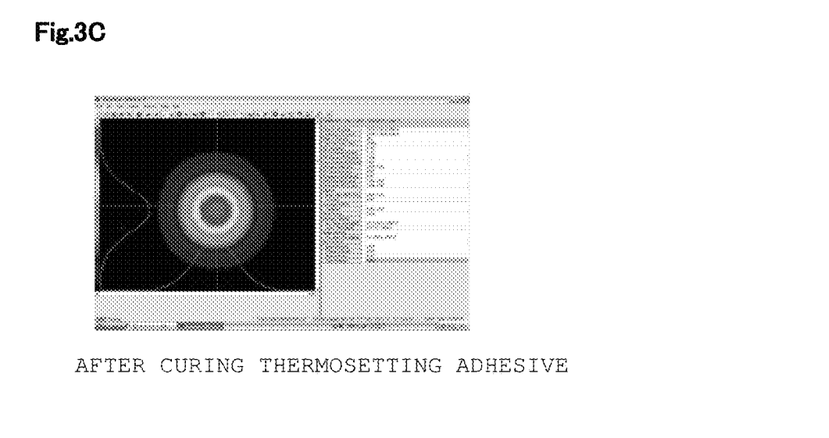
FIG. 3C is a photograph taken after the thermosetting adhesive was cured.

(2) FIGS. 3A, 3B and 3C are photographs of images showing, on the beam profiler, beams emitted from an end surface of the end cap of the pigtail fiber module according to Example 1 in which the narrow hole of the capillary incorporated in the tip end side of the ferrule housed the fiber core wire (the fiber core wire was exposed by removing the protective coating), the portion of the narrow hole at the through hole side was provided with the sealing member made of the elastic adhesive configured to shut the narrow hole off from the through hole, and the protective coating of the large mode area fiber housed in the through hole was fixed with the thermosetting adhesive. FIG. 3A is a photograph taken before the elastic adhesive was cured, FIG. 3B is a photograph taken after the elastic adhesive was cured, and FIG. 3C is a photograph taken after the thermosetting adhesive was cured.

Next, as shown in Table 1 below, no change in the circularity (0.99) and the Gaussian fitting value (0.97) was observed before the elastic adhesive constituting the sealing member was cured, after the elastic adhesive was cured, and after the thermosetting adhesive was cured which was poured from the side hole 25 for adhesive filling after the sealing member was formed.

TABLE 1

|  | Beam circularity | Gaussian fitting value |
| --- | --- | --- |
| Before the elastic adhesive was cured | 0.99 | 0.97 |
| After the elastic adhesive was cured | 0.99 | 0.97 |
| After the thermosetting adhesive was cured | 0.99 | 0.97 |

Note that, in the pigtail fiber module according to Example 2 also, no change in the circularity and the Gaussian fitting value was observed as in the case of Example 1 before the elastic adhesive constituting the sealing member was cured, after the elastic adhesive was cured, and after the thermosetting adhesive was cured which was poured from the side hole 25 for adhesive filling after the sealing member was formed. In other words, the result demonstrated that when the pigtail fiber modules according to Examples 1 and 2 were used, the intensity distribution of emitted light hardly changed. The superiority of the pigtail fiber modules according to Examples 1 and 2 was verified.

POSSIBILITY OF INDUSTRIAL APPLICATION

The pigtail fiber module according to the present invention does not cause a variation in a light intensity distribution of beams emitted from the large mode area fiber (LMA fiber). Thus, the pigtail fiber module according to the present invention has such an industrial applicability that it is applicable, for example, as a part of an optical connector in laser devices for processing.

REFERENCE SIGNS LIST

1: fiber core wire
2: protective coating
4: end cap
10: large mode area fiber (LMA fiber)
11: end capped fiber
12: fused portion
13: the fiber for the end cap
14: loose tube
18: loose-tube fixing portion
19: fiber fixing portion
20: metal ferrule
21: through hole
25: side hole for adhesive filling
30: capillary
31: narrow hole
40: sealing member
50: thermosetting adhesive
100: pigtail fiber module

What is claimed is:

1. A pigtail fiber module comprising:
a large mode area fiber having
a fiber core wire composed of a core where single-mode light travels and a clad surrounding an outer periphery of the core, and
a protective coating surrounding an outer periphery of the fiber core wire; and
a fiber holding member configured to hold a tip end side of the large mode area fiber, wherein
the pigtail fiber module has such a structure that:
the fiber holding member includes
a ferrule having a through hole at a main-body central portion thereof, and
a capillary incorporated in a tip end side of the ferrule and having a narrow hole at a central portion of the capillary, the narrow hole communicating with the through hole,
the narrow hole of the capillary houses the fiber core wire of the large mode area fiber from which a portion of the protective coating is removed,
the through hole of the ferrule houses the large mode area fiber having the protective coating,
an end portion of the narrow hole at the through hole side is provided with a sealing member configured to seal a gap between the fiber core wire and the narrow hole and shut the narrow hole off from the through hole,
the protective coating housed in the through hole is fixed to the through hole with a thermosetting adhesive, such that the thermosetting adhesive fixing the protective coating is not allowed to enter the narrow hole through the through hole, so that the thermosetting adhesive does not adhere to the fiber core wire in the narrow hole, and
the sealing member, which seals the gap between the fiber core wire and the narrow hole and shuts the narrow hole off from the through hole, is formed of silicone and the thermosetting adhesive is formed of epoxy.

2. The pigtail fiber module according to claim 1, wherein the elastic adhesive has a Shore A hardness of 70 or less when cured.

* * * * *